United States Patent [19]
Williams

[11] Patent Number: 5,821,714
[45] Date of Patent: Oct. 13, 1998

[54] IMPROVEMENTS IN AND RELATING TO MOTORS

[75] Inventor: Andrew James Stephen Williams, West Midlands, England

[73] Assignee: Lucas Industries public limited company, England

[21] Appl. No.: 904,857

[22] Filed: Aug. 1, 1997

[30] Foreign Application Priority Data

Aug. 3, 1996 [GB] United Kingdom .................... 9616355

[51] Int. Cl.⁶ .................................................. H01R 39/46
[52] U.S. Cl. ........................ 318/439; 318/138; 318/254; 318/599; 318/798; 318/799; 318/800; 318/801; 318/802; 318/803; 318/804; 318/805; 318/806; 318/807; 318/808; 318/809; 318/810; 318/811; 318/812; 318/813; 318/814; 318/815
[58] Field of Search ..................................... 318/439, 138, 318/254, 599, 798–815

[56] References Cited

U.S. PATENT DOCUMENTS 4,164,697  8/1979  Everett ................................ 318/138 X
5,191,269  3/1993  Carbolante .

FOREIGN PATENT DOCUMENTS 2188801  10/1987  United Kingdom .

*Primary Examiner*—Karen Masih
*Attorney, Agent, or Firm*—MacMillan, Sobanski & Todd, LLC

[57] ABSTRACT

A commutation control strategy for eliminating torque ripple and noise from a brushless motor which has a plurality of motor phases connected in a bridge, each phase having a top switching device provided between a phase winding and a positive voltage supply and a bottom switching device provided between the phase winding and a less positive voltage supply in which following commutations of the motor, when the current flowing in a first phase is decaying towards zero and the current in a second phase is rising from zero, the switching devices are operative between a state in which the current flowing in the first phase is caused to decay at a first rate, and another state in which the current flowing in the first phase is caused to decay at a second rate which is lower than the first rate so that the rate of decay of the current in the first phase substantially matches the rate of rise of the current in the second phase.

15 Claims, 5 Drawing Sheets

IMPROVEMENTS IN AND RELATING TO MOTORS

BACKGROUND OF THE INVENTION

This invention relates to a control strategy for an electric motor, and is especially suited to the control of brushless direct current motors.

Brushless direct current (BLDC) motors offer an electric motor which has the advantages of simple operation, high speed operation and increased operational life when compared to equivalent sized brushed electric motors by virtue of the elimination of the commutation and bush gear.

In a typical BLDC motor, a rotor is rotatably mounted inside a stator. The stator has a plurality of protruding elements, each element being provided with a coil winding, and the rotor has a plurality of poles. The coil windings are connected together in sets, with each set of connected windings defining a phase winding. The phase windings are then connected together at a star point. Usually, at least three, or possibly more, phases are provided.

Energising the phases by applying a voltage across them causes the rotor to rotate so as to align with the magnetic flux portion generated by the energised windings. Thus, in order to control the direction and speed of rotation of the rotor, the phases must be excited in a controlled sequence using a control strategy.

The control strategy of the motor is arranged so that at any one time current is flowing in two of the phases (the phases are energised), whilst no current flows in the third phase (the neutral phase). As the rotor rotates, one of the energised phases is switched under the influence of the control strategy to become the neutral phase, and, simultaneously, the neutral phase is switched to carry current. This event is known as commutation.

In order to enable switching of the current in the phases, each of the phase windings is connected to a positive voltage supply through a first switching means, which is usually a transistor in parallel with a diode, and to a less positive voltage supply through a second switching means again usually a transistor in parallel with a diode. Switching on of a transistor enables current to flow through it to the phase winding from the voltage supply, and switching off the transistor isolates the phase winding from the voltage supply.

A disadvantage with the method of controlling a motor described hereinbefore is that when a phase which is carrying a current is switched to become the phase which carries no current (i.e. commutation causes the phase to switch from an energised state to a neutral state), a transient drop in current is produced in one of the other phases. This transient results in a transient drop in torque and in addition generates unwanted acoustic noise.

The transient originates from the attempt to enforce fast changes of current in the inductive load presented by the motor windings. During the instant after a commutation has been initiated (i.e. immediately after the transistors have been switched), the current in a first phase which will become the neutral phase is decreasing. Simultaneously, the current in a second phase which was the neutral phase is increasing. However, and importantly, the current in the first phase falls towards zero at a much greater rate than the current increases in the second phase. It is this difference in the two rates of change of current flow that produces the transient drop in current in the third phase. This is shown in FIG. 9.

SUMMARY OF THE INVENTION

In accordance with the present invention, a brushless motor is controlled by providing a plurality of motor phases connected in a bridge, each phase having a top switching means provided between a phase winding and a positive voltage supply, and a bottom switching means provided between the phase winding and a less positive voltage supply, in which, following commutation:

when the current flowing in a first phase is decaying towards zero and the current in a second phase is rising from zero, the switching means are operative between a state in which the current flowing in the first phase is caused to decay at a first rate, and another state in which the current flowing in the first phase is caused to decay at a second rate which is lower than the first rate, whereby the overall rate of decay of the current can be controlled within given values.

Thus by alternating between a first and a second rate of decay, the value of the current in the phase which is becoming the neutral phase, can be controlled.

Preferably, the duration of time in which the switching means are in the first and second state following commutation may be varied, and most preferably, the duration of time in the first and second states is chosen so that the rate of decay of the current in the first phase substantially matches the rate of rise of the current in the second phase. This has the advantage of substantially eliminating the transient which would occur if the rate of fall and rate of rise of the currents were different.

In the first state the switching means may be operated to form a zero volt loop around the bridge whereby the first phase winding forms a part of a low impedance loop around the bridge and the current drawn by the winding is in the same sense as the current drawn prior to commutation.

In the second state the switching means may be operated to form around the bridge a negative volt loop whereby the first phase winding draws current from the opposite supply voltage to that from which current was drawn by the phase prior to commutation i.e. the current stays in the same sense, but is opposed by the applied voltage.

Preferably three motor phases are connected in a star formation within a bridge.

The switching means may each comprise a transistor connected in parallel with a diode. The switch means can then be operated by applying a suitable current signal to the base of the transistor. Alternatively, more than one transistor may be provided for each switching means.

Preferably, in each phase of the bridge, the top switching means may be operated by applying a first pulse width modulated signal and the bottom switching means may be operated by applying a respective second pulse width modulated signal which is in anti-phase to the first signal. In this method, the transistors on all three phases of the motor are undergoing pulse width modulation. This differs from the motor control method known in the art in which the top and bottom switching means in the neutral phase are not modulated. An interlock delay may also be provided to prevent current shoot through due to the finite switching time of the transistors. By operating the switch means as described, it is possible to control independently the average voltage applied to each phase.

The PWM waveforms applied to each of the switching means may have the same phase, and may be centre-aligned with one another to minimise electrical noise.

The PWM waveforms applied to each phase may further be chosen so that, during operation of the motor, the net voltage applied across one of the phases is of an arbitrary constant value, whilst the net voltage applied across the remaining two phases is respectively greater than and less than the arbitrary value by a variable amount x. By altering the value of x, the speed of the motor can be controlled. This method of motor control has the advantage that the switching means are automatically switched to be in the first state and second state following commutation during every pulse width modulation period, whilst maintaining the condition that a current flows in only two of the three phases, at any time.

Preferably, the PWM waveforms may be varied following a commutation so as to vary the ratio of the time spent in the zero volt loop state and the time spent in the negative volt loop state.

Slowing the rate of decay of the current retards the exact time at which commutation occurs. Therefore, the position at which commutation is initiated may be varied. For instance, the commutation points may be advanced spatially in order to compensate for an increased duration of commutation which arises from slowing the rate of current decay.

BRIEF DESCRIPTION OF THE DRAWINGS

There will now be described, by way of example only, an embodiment of the present invention with the aid of the following drawings in which.

DETAILED DESCRIPTION OF THE PREFERRED EMBODIMENT

Figure 1:
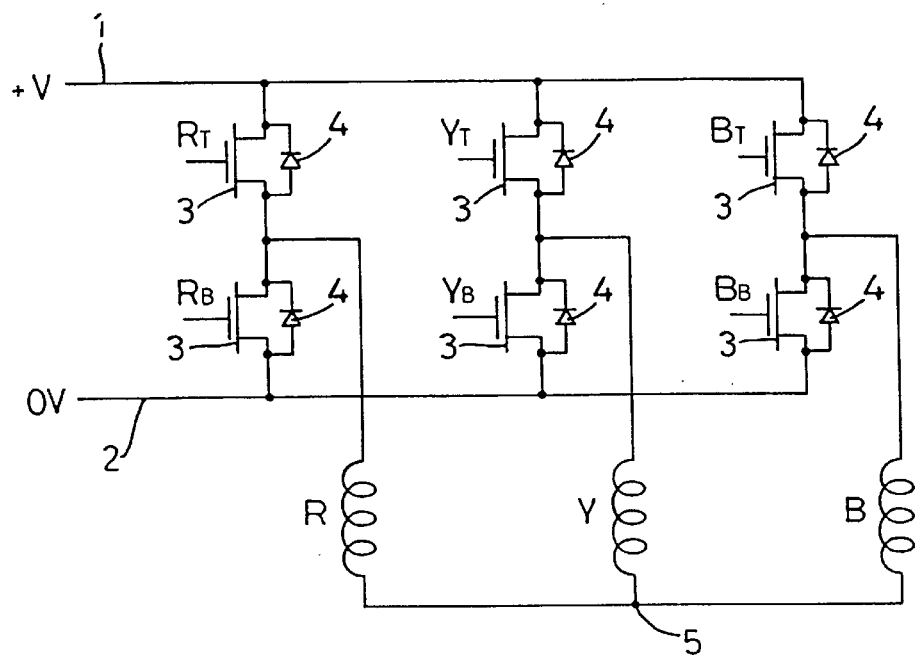
FIG. 1 shows the motor phase windings and switching means used to control the current flowing through the phase windings.

In FIG. 1, a motor comprising a rotor which is rotatably mounted within a stator is provided with three phase windings (R, Y, B). Each phase winding is connected to a positive voltage supply line 1 of value V volts via a top switching means ($R_T, Y_T, B_T$), and to a zero volts supply line 2 via a bottom switching means ($R_B, Y_B, B_B$). The switching means each comprise a transistor 3 connected in parallel with a diode 4. Each phase winding is assumed to be identical, and, in particular, to have the same resistance. The phases are connected at a star point 5.

Figure 2:
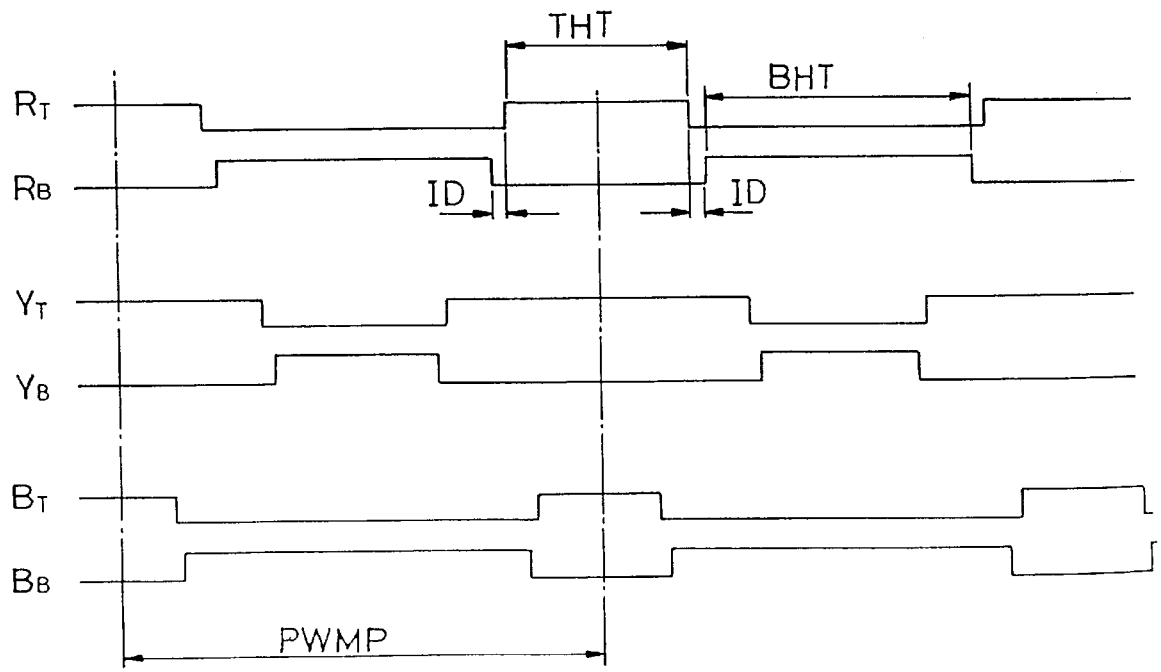
FIG. 2 shows the pulse width modulation waveforms applied to each of the transistors.

In this control method, the six transistors are operated by applying a pulse width modulated signal to their respective gates and the top and bottom transistors are operated in anti-phase. The signals are also centre-aligned and have the same period PWMP. This is shown in FIG. 2. An interlock delay ID is also incorporated to avoid current shoot-through.

Using this switching strategy, the average voltage applied to the motor phase is given by:

$$\frac{\text{TOP\_HIGH\_TIME}}{\text{TOP\_HIGH\_TIME} + \text{BOTTOM\_HIGH\_TIME}} \times \text{Bridge\_Supply\_Voltage}$$

where the bridge supply voltage is the voltage of the positive supply line 1, and TOP_HIGH_TIME and BOTTOM_HIGH_TIME are denoted by THT and BHT in FIG. 2 of the drawings.

Figure 3:
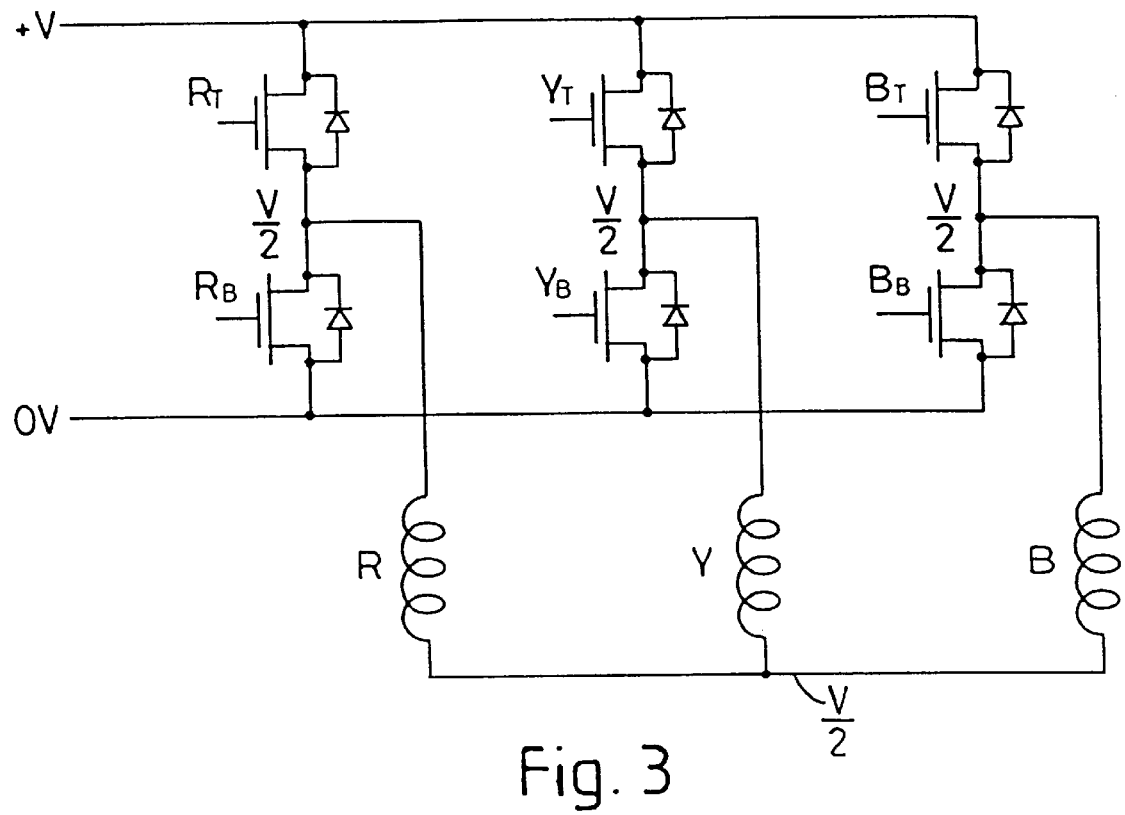
FIG. 3 shows an equilibrium condition where the same average voltage is applied to each phase.

The pulse width modulation signals applied to each of the transistors are chosen so that a net current only flows in two of the three phases, with zero current flowing in the third phase. FIG. 3 shows the net voltages applied to the three phases for the case when no torque is to be generated. Identical (but phase shifted) first and second waveforms are applied to the top and bottom transistors in each phase of the motor so that the net voltage applied to each phase winding has the same arbitrary value. As shown in FIG. 3 this value is chosen to lie midway between the positive and ground voltage supplies, i.e. ½V. The voltage at the star point will therefore also be ½V, and no current will flow in any of the phase windings.

Figure 4:
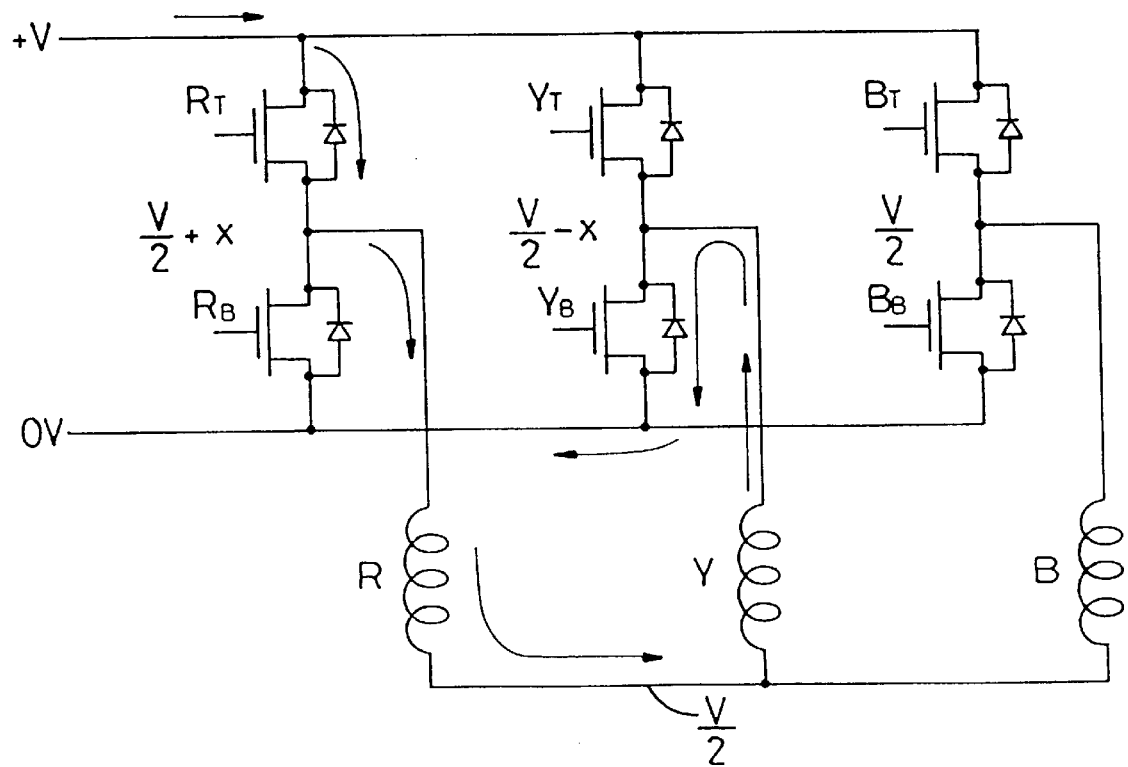
FIG. 4 shows an example of the currents flowing in the phases according to the control strategy herein described.

FIG. 4 shows an example of the current flowing in the windings using this method of control when the motor is producing torque. The pulse width modulation duties of the signals applied to the top and bottom transistors are varied from those used when the motor is stationary so that the net voltage applied to the red phase is now (½ V+x), the net voltage applied to the blue phase remains ½V, and the net voltage applied to the yellow phase is now (½ V−x). Current will now flow into the red phase and out of the yellow phase. Because the resistance of each phase has been assumed to be identical, the voltage at the star point is still ½V, and so no net current flows in the blue phase. Hence, the requirement for driving a DC brushless motor is met. The value of the variable voltage x is chosen in response to a motor current demand, and increasing the magnitude of x will cause the current flowing in the windings of the motor to increase.

Figure 5:
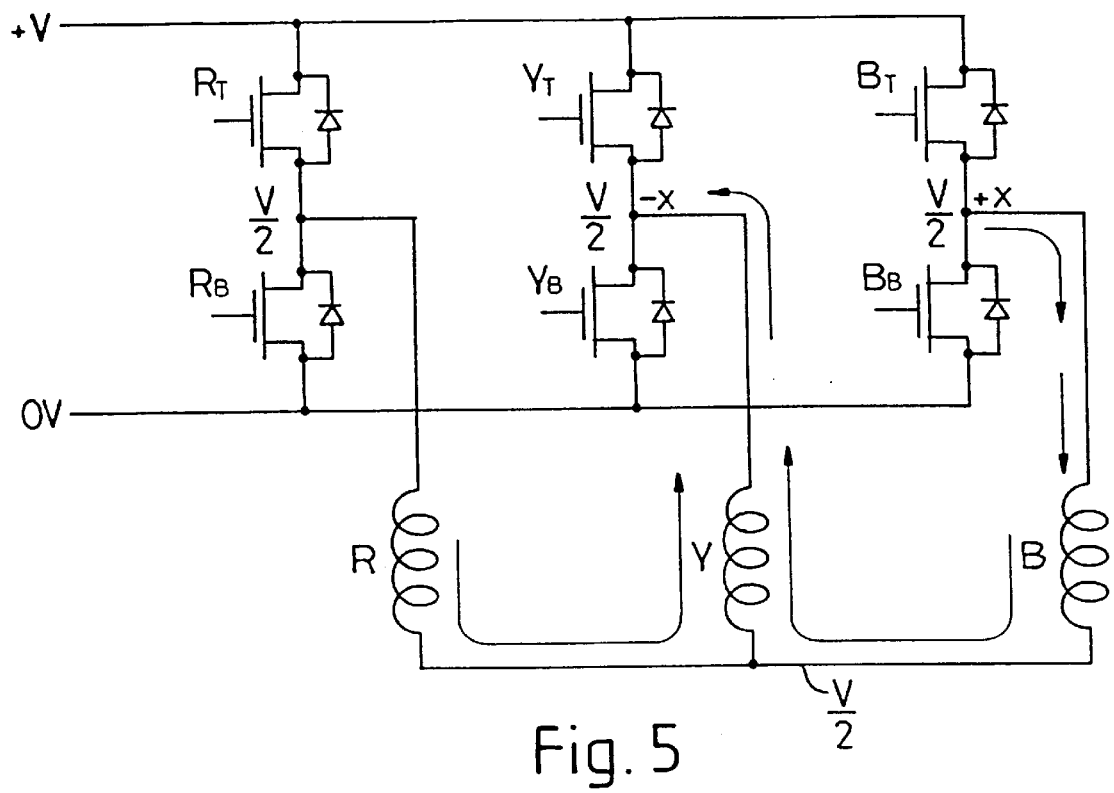
FIG. 5 shows the currents flowing in the phases immediately after a commutation event.

Consider the case where a commutation occurs, so that the current in the red phase falls to zero, and the current in the blue phase rises from zero. This commutation is performed in this method by changing the duty cycle of the PWM waveforms applied to each phase. In this case, the PWM signals applied to the transistors in the red phase are varied so that the net voltage applied to the red phase winding changes from (½V+x) to (½V), and similarly for the blue phase winding in which the PWM signals applied to the top and bottom transistors are varied so that the applied voltage changes from (½V) to (½V+x) as shown in FIG. 5. Notably, the period of the PWM signals remains the same and the waveforms remain centre-aligned.

Immediately following commutation when the current is falling in the red phase, the state of the switches will vary from a first state to a second state within each part of the pulse width modulation period. The current flowing through the phase windings in the two states is shown in FIGS. 6 and 7 respectively.

Figure 6:
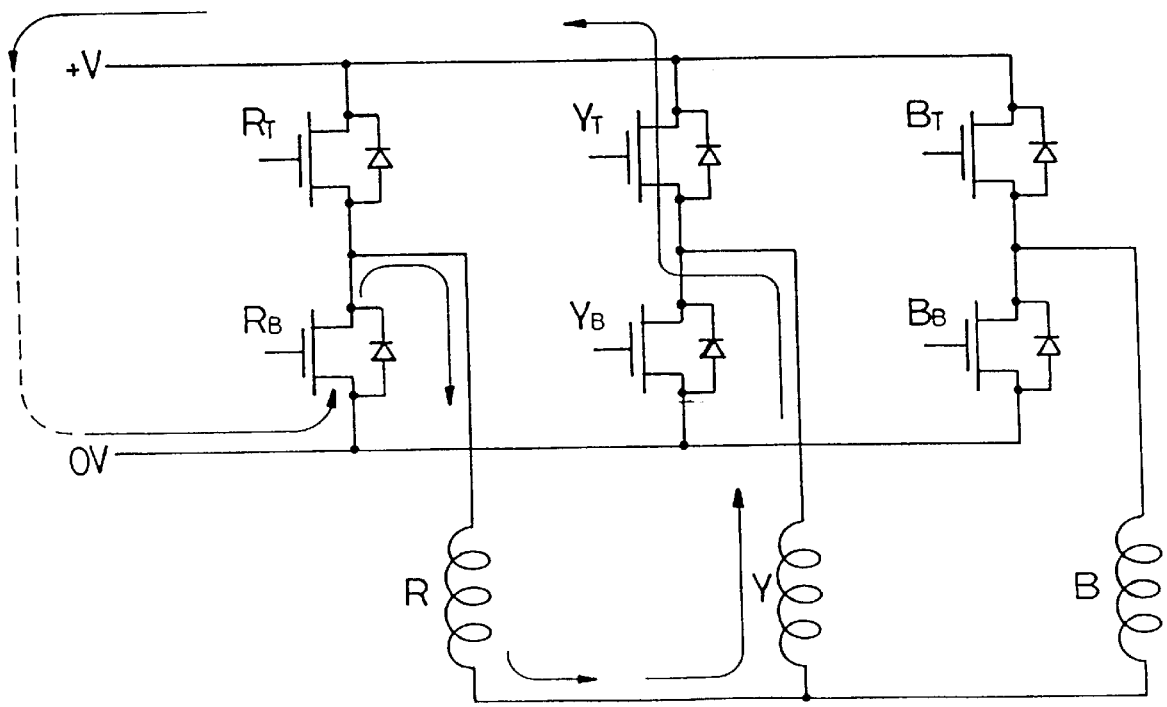
FIG. 6 shows the first switching state during commutation.

In FIG. 6, showing the first state, the top transistor in the red phase is open (non-conducting) and the bottom transistor is closed (conducting). This arrangement of switches defines a negative volt loop. The current flowing into the red phase winding prior to commutation will still continue to flow into the phase winding due to its inductance. The current flows from the 0v rail through the diode associated with the bottom transistor in the red phase. Hence the voltage supply is reversed, and the current flow in the red phase falls rapidly towards zero.

Figure 7:
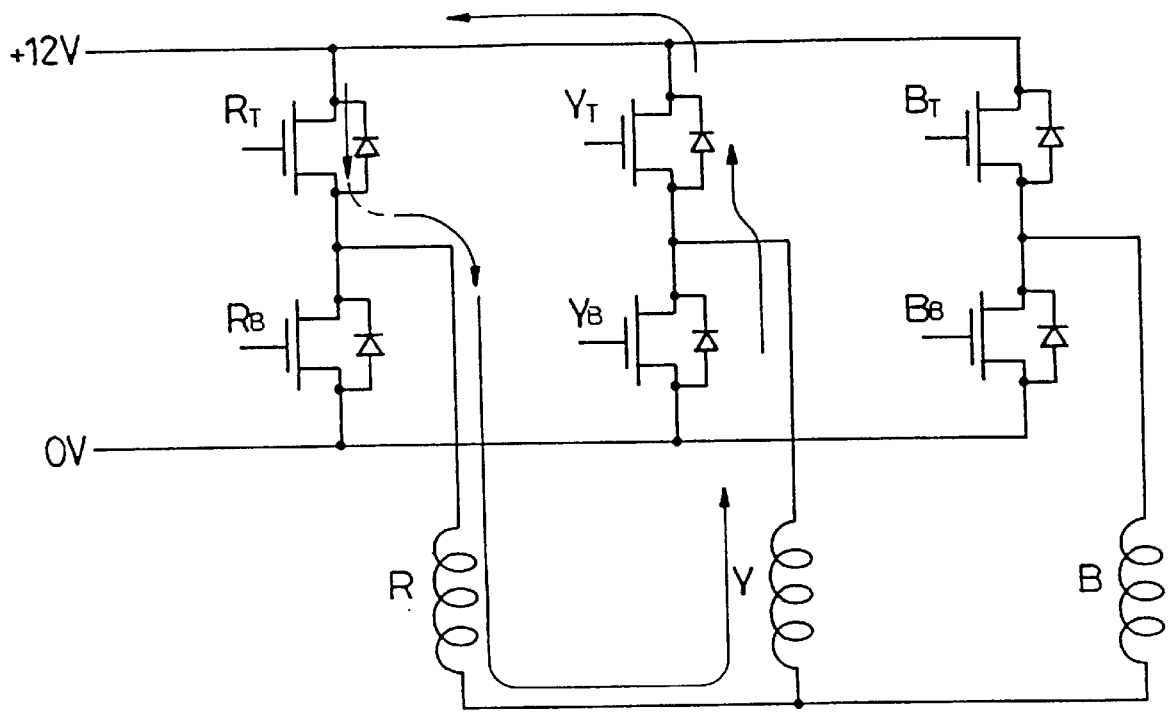
FIG. 7 shows the second switching state during commutation.

FIG. 7 shows the second state in which the transistors in the phases are now in the opposite state to that in FIG. 6. This arrangement of switches comprises a zero volt loop. The red phase winding now forms a part of a low impedance loop and the current falls slowly. It will, however, be readily appreciated that for a commutation in which a phase carrying a negative current becomes the neutral phase, the first state will constitute a zero volt loop and the second state will constitute a negative volt loop, i.e. the two states will be reversed.

Thus, this method inherently switches the motor phase windings between a zero volt loop and a negative volt loop, controlling the rate of fall of the current. The rate of rise of the motor drive current in the phase is more closely matched to the rate of fall of current in an associated phase, thus torque ripple and noise is eliminated.

In a refinement of the above strategy a voltage other than ½V is applied to the neutral phase for a predefined period after commutation, to give a predetermined ratio of duration of negative to zero volt loop, to control the rate of decay of current in that phase. After this predefined period is complete, the transistors on the neutral phase are returned to a state which applied a voltage of ½V to the phase winding by pulse width modulation of the top and bottom transistors, or the top and bottom transistors can both be switched off to ensure that zero current flows in the neutral phase.

Thus, the refined method differs from the prior art in that the state of the phases is switched between a zero volt loop and a negative volt loop immediately following commutation, although either side of a commutation event the method controls the motor in the manner known in the prior art.

As an example of the refined method, the negative volt loop may be invoked for, say 75% of the modulation period, and the zero volt loop may be invoked for the remaining 25% of the time. It is notable, however, that the zero volt loop is invoked in different ways according to the sign of the current in the phase immediately before commutation. If the current is flowing into the motor phase before commutation, the zero volt loop is invoked by switching the top transistor on. If the current is flowing out of the motor phase before commutation, then the zero volt loop is invoked by switching the bottom device on. Since commutations occur alternately as each of these two cases, the particular PWM duty to give, say, a 75%/25% negative/zero volt loop ratio is individually calculated according to the type of commutation.

Figure 8:
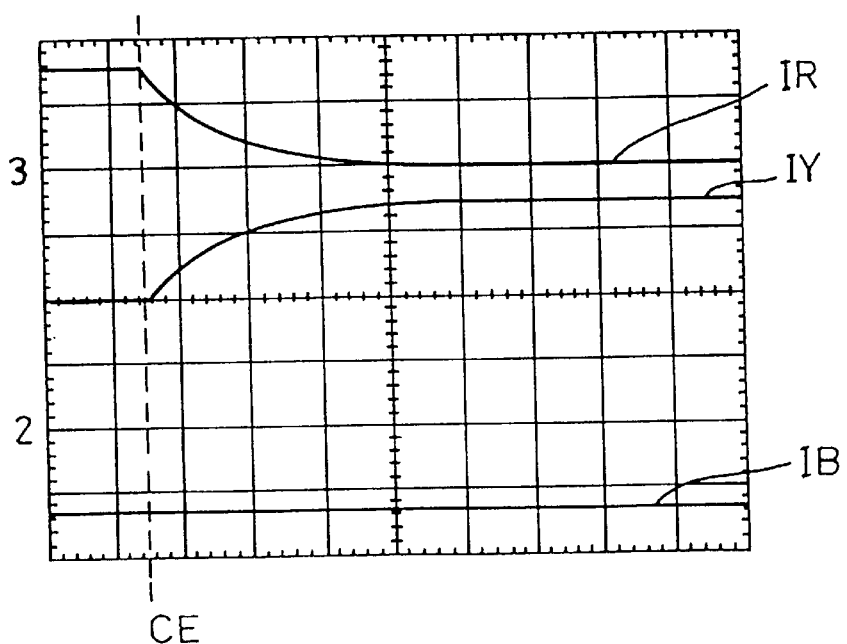
FIG. 8 shows a set of measured phase currents obtained using the method of the present invention.
Figure 9:
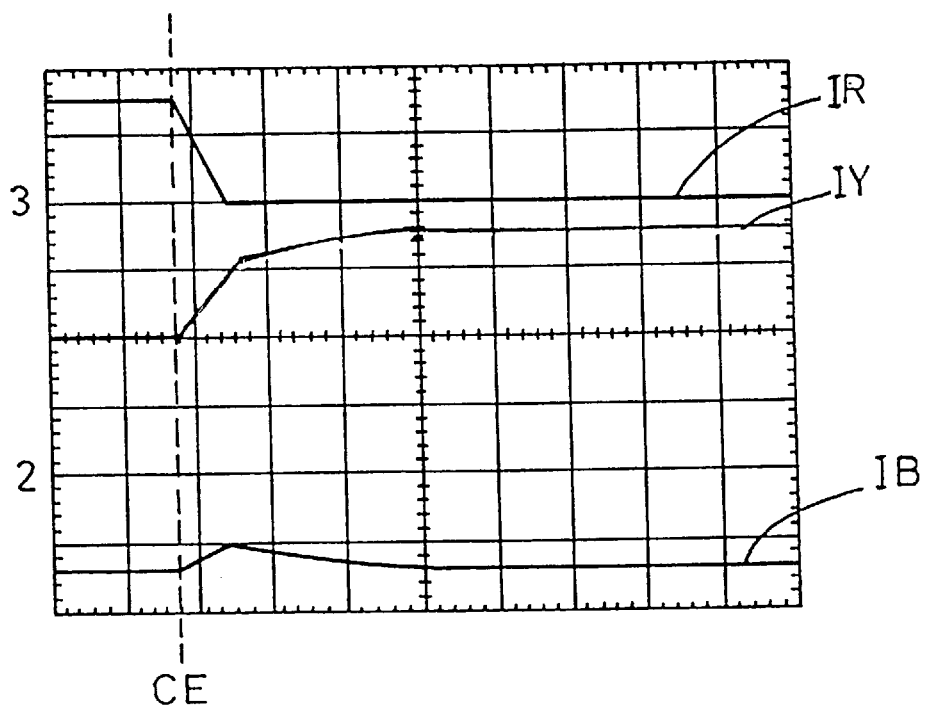
FIG. 9 shows a set of measured phase currents obtained using a prior art commutation method.

Finally, FIG. 8 shows a set of measured phase currents $I_R, I_Y, I_B$ obtained using the method of the present invention during a commutation event CE. In comparison with FIG. 9 the transient in torque has been eliminated by reducing the rate of fall of current in the phase. Thus, the above described method has been shown to be capable of successfully reducing the undesirable transients which arise during commutation using the prior art motor control method.

In a further refinement to the present invention, the position at which commutations occur may be advanced in time. The amount of advance applied will depend on the motors electrical time constant. Advancing commutation is useful in combination with the method described herein before as the slowing of the rate of decay of current in the phase which becomes the neutral phase results in a small loss of motor torque as it effectively increases the duration of commutation. Advancing the commutation point compensates for this slower commutation and allows motor torque to be regained. As the time required for commutation is dependent on motor electrical time constant, which is fixed, the amount of advance required may also be a fixed arbitrary value.

What is claimed is:

1. A control apparatus for controlling a brushless motor comprising a stator, a rotor and a plurality of phase windings, said motor being connected into a control circuit to form a plurality of phases in which an end of each phase winding is connected to a positive voltage supply through a top switching device and a less positive voltage supply through a bottom switching device, and in which, following a commutation wherein a first current flowing in a first one of said phase windings is decaying towards zero and a second current in a second one of said phases is rising from zero, said switching devices are operative between a first state in which said first current is caused to decay at a first rate and a second state in which said first current is caused to decay at a second rate which is lower than said first rate whereby the overall rate of decay of said first current can be controlled within given values.

2. Apparatus according to claim 1, in which said switching devices are in said first state and said second state for a duration of time which is variable.

3. Apparatus according to claim 1, in which said duration of time in which said switching devices are in said first and second states is chosen so that the rate of decay of said first current in said first phase to substantially match the rate of rise of said second current in said second phase.

4. Apparatus according to claim 1, in which in said first state said switching devices are operated to form a zero volt loop whereby said first phase winding forms a part of a low impedance loop around said bridge and said first current drawn by said first phase winding is in the same sense as the current drawn prior to said commutation event.

5. Apparatus according to claim 1, in which in said second state said switching devices are operated to form around said bridge a negative volt loop whereby said first phase winding draws current that is opposed by the voltage supply.

6. Apparatus according to claim 1, in which each of said top switching devices and said bottom switching devices comprise a transistor connected in parallel with a diode.

7. Apparatus according to claim 1, in which said motor comprises three phase windings which are provided connected in a star formation.

8. Apparatus according to claim 1, in which in each said phase, said top switching device is operated by applying a first pulse width modulated (PWM) signal and said bottom switching device is operated by applying a respective second pulse width modulated (PWM) signal which is in anti-phase to said first signal.

9. Apparatus according to claim 8, in which an interlock delay is provided.

10. Apparatus according to claim 8, in which said PWM signals applied to each of said switching devices have the same phase.

11. Apparatus according to claim 10, in which said PWM signals are centre-aligned with one another.

12. Apparatus according to claim 8, in which said PWM signals are adapted so that the net voltage applied across one of said phase windings is of an arbitrary constant value, whilst the net voltage applied across the remaining two phase windings is respectively greater than and less than the arbitrary value by a variable amount x.

13. Apparatus according to claim 12, in which said PWM signals are varied for a predefined period following a commutation so as to vary the ratio of the time spent in said zero volt loop state and the time spent in said negative volt loop state.

14. Apparatus according to claim 13, in which after said predefined period said PWM signals return to applying a net voltage of said arbitrary constant value.

15. Apparatus according to claim 1, in which the position at which commutation is initiated is varied.

* * * * *